Oct. 22, 1957 C. J. KLEIN 2,810,187
APPARATUS FOR CUTTING METAL BUNDLES
Filed July 31, 1952 8 Sheets-Sheet 1

FIG. 1.

INVENTOR
CLARENCE J. KLEIN
BY
ATTORNEY

Oct. 22, 1957 C. J. KLEIN 2,810,187
APPARATUS FOR CUTTING METAL BUNDLES
Filed July 31, 1952 8 Sheets-Sheet 4

INVENTOR
CLARENCE J. KLEIN
BY
ATTORNEY

Oct. 22, 1957 C. J. KLEIN 2,810,187
APPARATUS FOR CUTTING METAL BUNDLES
Filed July 31, 1952 8 Sheets-Sheet 5

INVENTOR
CLARENCE J. KLEIN
BY
ATTORNEY

Oct. 22, 1957 C. J. KLEIN 2,810,187
APPARATUS FOR CUTTING METAL BUNDLES
Filed July 31, 1952 8 Sheets-Sheet 6

INVENTOR
CLARENCE J. KLEIN
BY
ATTORNEY

United States Patent Office 2,810,187
Patented Oct. 22, 1957

2,810,187

APPARATUS FOR CUTTING METAL BUNDLES

Clarence J. Klein, Marland Heights, W. Va., assignor to National Steel Corporation, a corporation of Delaware Application July 31, 1952, Serial No. 301,885

7 Claims. (Cl. 29—69)

This invention relates to metal cutting and more particularly to apparatus for cutting bundles of scrap metal such as tightly entwined ribbons of tinplate scrap.

While the present invention will be described more particularly in connection with the cutting of bundles of tinplate scrap for chemical treatment to remove the tin, the present invention is not limited to this use and may be employed for cutting other materials and in use with other processes.

Tin has become a scarce and valuable material and processes have been devised for recovering tin from different sources of tin bearing scrap. One of the largest sources of tin bearing scrap comprises tinplate scrap produced particularly in the production of electrolytic tinplated strip. To the greater part this type of scrap occurs in long, thin ribbons produced when the edges of the electrolytic tinplated strip are trimmed by continuously passing the electrolytic tinplate strip through trimmers which sever a continuous band or ribbon from each edge of the strip. For ease of handling, it has become common practice to wind these bands, under tension, on mandrels to form bales in which the ribbons of tinplate strip are haphazardly entwined.

Tin bearing scrap is usually detined by bringing the tin coated metal into intimate contact with a suitable mixture of chemicals which reacts to remove the tin from the metal and form a tin compound in solution which may be recovered by further processing. In order to obtain a high percentage of tin from the tinplated scrap without requiring an abnormally long period for the chemical treatment, it is necessary to present the scrap so that the detinning chemical mixture may intimately contact the tin bearing surface areas. For these reasons, it is necessary to unwind, cut or sever apart the bales of entwined ribbons of electrolytic tinplate strip before this source of tin bearing scrap may be chemically processed at a sufficiently high efficiency to render the process financially feasible.

It is therefore an object of the present invention to provide a novel method of and apparatus for cutting bundles of scrap metal.

Another object is to provide a novel method of and apparatus for treating bundles of entwined ribbons of tinplate scrap to allow subsequent chemical detinning treatment with a high degree of efficiency.

Another object is to provide a novel method of and apparatus for holding and cutting metallic objects.

Another object is to provide a novel method of and apparatus for cutting bundles of entwined ribbons of electrolytic tinplate scrap so that the bundles readily fall apart presenting relatively short pieces of loose ribbons for efficient reaction in a chemical detinning solution.

Still another object of the present invention is to provide a novel method of plurally severing a bundle of entwined ribbons of electrolytic tinplated strip so that the bundle falls apart and presents a loose mass of relatively short pieces of tinplated strip, and a novel apparatus for performing this method including means for severing the bundle transversely at one or a number of places spaced longitudinally of the bundle and for further severing each of the transversely cut portions.

Other objects and features of the present invention will appear more fully from the following detailed description considered in connection with the accompanying drawings which discloses several embodiments of the invention. It is to be expressly understood however, that the drawings are designed for purposes of illustration only and not as a definition of the limits of the invention, reference for the latter purpose being had to the appended claims.

In the drawings, in which similar reference characters denote similar elements throughout the several views:

Figure 2 is a plan view of the apparatus of Figure 1 with portions of the apparatus in different positions;

Figures 4, 11, 12:
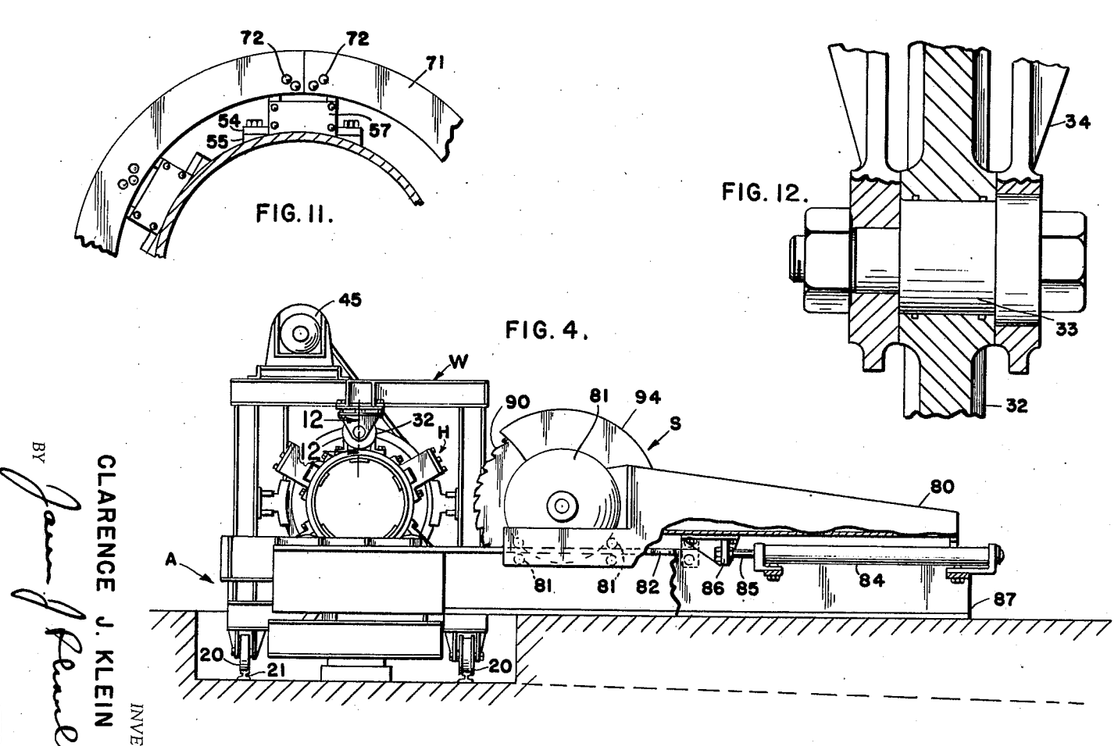
Figure 4 is an end view taken along line 4—4 of Figure 3 and having portions broken away better to illustrate the construction.
Figure 11 is a fragmentary view, partially in section, taken along line 11—11 of Figure 7.
Figure 12 is an enlarged, fragmentary sectional view, taken along line 12—12 of Figure 4.

An apparatus embodying the principles of the present invention includes a carriage A having wheels 20 mounted on rails 21 with the carriage A being movable back and forth along the rails 21 by a fluid operated cylinder F which may be a pneumatic or a hydraulic cylinder. Preferably the cylinder F is a hydraulic cylinder so that the movement of the carriage can be more accurately controlled. The wheels 20 on one side of the carriage A may be double flanged as shown in Figure 4 or all of the wheels 20 may be flanged to hold the carriage on the rails 21. The cylinder F is connected at its rod end through pipe 22 to a source of liquid under pressure and is connected at its head end through a pipe 23 to the same or a different source of liquid under pressure. By operating suitable control means, not shown, the operator can admit fluid under pressure to the rod end at 22 to move the carriage forwardly toward the right or admit fluid under pressure to the head end at 23 to move the carriage rearwardly toward the left. The cylinder F is mounted in a fixed support 25.

The carriage A supports a cradle C adapted to receive the bundles 26, one by one, and means for holding and rotating a bundle, shown at H. A separately supported saw S is provided for cutting the bundle. After the bundle has been cut, the cut portion or pancake 28 is deposited on the receiving table T after which the saw S is moved to split the portion 28 and then the table T is tilted to discharge the split portion. An inclined ramp R having a retractable stop U for feeding the bundles 26 forwardly and downwardly one by one and onto the cradle C. A pusher P is provided on carriage A for advancing one or more bundles to and through the means H which holds and rotates the bundle while being cut.

The means H for holding and rotating a bundle 26 includes an elongated, cylindrical holder or drum 30 supported for rotating about its longitudinal axis. A ring or rail 31 encircles the forward end of holder 30 and is mounted between three rolls 32 spaced about the outer periphery of the rail. Each roll 32 is mounted on a short shaft 33 supported in bracket 34, Figure 12. The brackets 34 are rigidly mounted on and secured to the supporting frameworks. Adjacent the opposite or back end of the holder 30, a second similar rail 36 encircles the drum. The rail 36 is rotatably mounted on three rolls 37 equally spaced about the periphery of the rail. Each roll 37 is in turn rotatably mounted in a bracket 38 supported by the supporting framework W.

The present invention provides means for holding the rings on rails 31 and 36 on their respective sets of rolls 32 and 37 and to prevent longitudinally shifting of holder 30. As shown more clearly in Figures 8 and 9, a pair of guide rolls 40 are mounted on opposite sides of the rail 36. Each guide roll 40 is rotatably mounted on a pin 41 carried by member 42 mounted on the supporting framework W. A second pair of identical guide rolls are mounted on the opposite sides of the holder in position to engage the rail 31. Especially when a bundle is being pushed through the holder 30, a relatively large force is developed tending to push the holder off of the rolls 32 and 37. The guide rolls 40 provide relatively strong means for holding the holder in position on the rolls. The action of the guide rolls is more positive in holding the rails in position on the supporting rolls than flanges on the rolls would be although flanged rolls may be used.

Power actuated means is provided for rotating the holder 30 and the bundle or bundles therein. On top of the framework W there is a drive motor 45 connected through a gear reducer 46 to a drive shaft 47 carrying on its outer end a relatively smaller drive pulley 48. A relatively large pulley 49 encircles and is connected to the holder 30. A V-belt 50 connects the pulleys 48 and 49 so that when the motor 45 is energized, the holder 30 and the bundle therein are rotated about the longitudinal axis of holder 30.

Power actuated clamping means is provided for releasably clamping and holding the bundle in the holder 30 so that the bundle is held securely and rotated with the holder. Six clamps 52 are mounted on and spaced about the periphery of the holder. These clamps or holders 52 are identical and only one will be described in detail. Referring more particularly to Figures 7, 8, 10 and 14, each clamping device 52 includes a holder or housing 54 mounted on pads 55 spaced about the periphery of the holder 30. The housing 54 is held in place by bolts 56 and includes a rearwardly extending open portion 57. A clamping jaw 58 is supported in the housing 54 in alignment with an opening 59 in the periphery of the holder 30. One each of the two sides of the jaw 58, there is a slide 60, and each slide 60 extends rearwardly from the housing 54 into the housing extension 57, Figure 14. A cover 62 is fastened in place on top of the housing 52 and the cover 62 includes portions 63 projecting downwardly into the housing with each portion 63 engaging the top of a respective one of the slides 60. Each slide 60 is held in place between the respective upper cover projection 63 and lower pad 55. With the projection 63 and pad 55 providing horizontal ways for the respective slide 60, each slide 60 is horizontally slidable in these ways. At each side of the jaw 58 there is an inclined, relatively deep recess or cam slot 64 in which there is mounted an elongated cam follower 66. Each slide member 60 is also provided with a relatively shallow recess 65 matching the respective recess 64. Each cam follower 66 is provided with a stud screw 67 having a head positioned in a recess in the respective slide member 60. An access slot 68 is provided in each side of the housing 54 for providing access to the screw 67. The two slide members 60, when moved forwardly toward the right in Figure 7, cause the cam followers 66 to move upwardly along the respective slots 64 and, in time, move the jaw 58 inwardly toward the center of the holder 30. Conversely, when the slides 60 are moved rearwardly or retracted toward the left in Figure 7, the jaw 58 is raised or moved outwardly away from the center of the holder 30.

Power actuated means is provided for actuating the clamping devices 52 simultaneously to move the jaws 58 inwardly and outwardly. Each clamping device 52 includes a connecting member 69 mounted in the open portion 57 of the housing and each connecting member 69 is mounted between the rearwardly extending portions of the slides 60 and connected thereto by a pin 70 which extends through the connecting member 69 and the two slide members 60. An annular ring 71 extends about the outer periphery of the bundle holding cylinder 30 and the ring 71 is connected to each member 69 by means of screws 72. Thus, when the ring 71 is moved forwardly or rearwardly of the holder 30, all of the slides are moved in the same direction and all of the jaws 58 are moved inwardly or outwardly. Each jaw 58 is restrained against movement longitudinally of holder 30 between the forward wall of housing 54 and the depending, rear wall of cover 62 that also engages the tops of slides 60.

Figure 8:
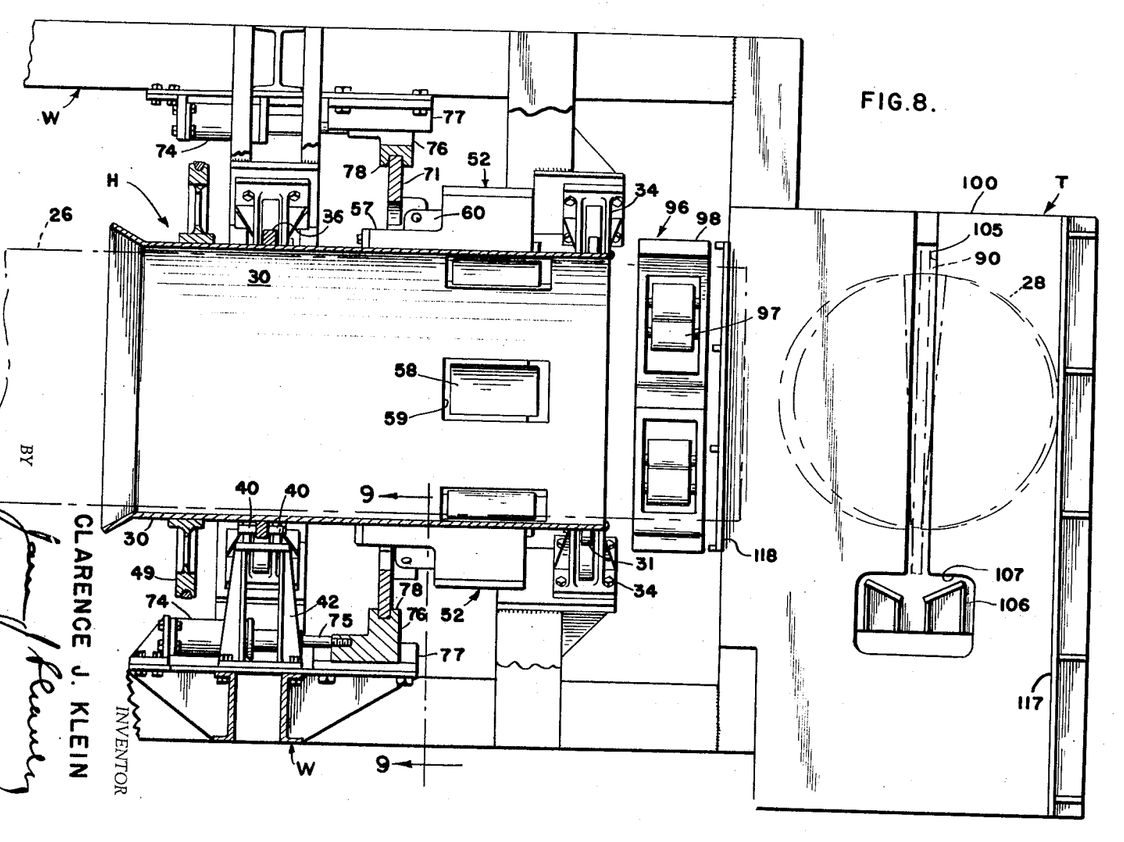
Figure 8 is an enlarged, horizontal, fragmentary sectional view taken along line 8—8 of Figure 3.
Figure 9:
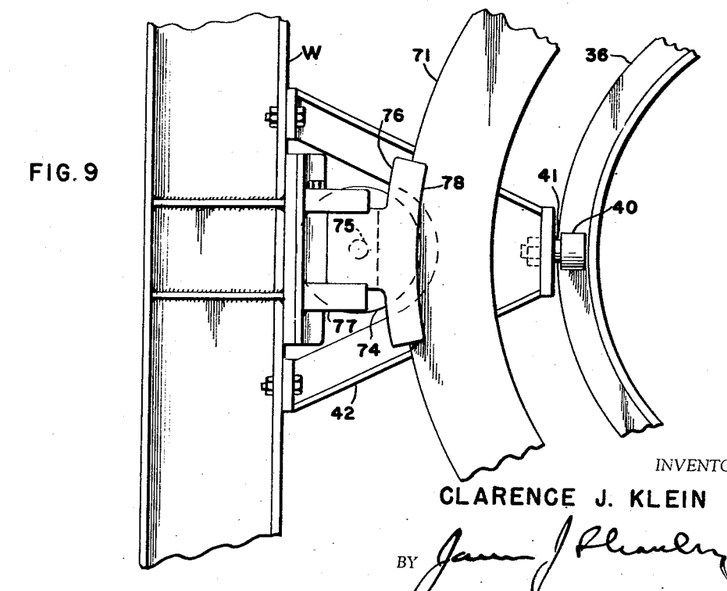
Figure 9 is an enlarged fragmentary view taken along lines 9—9 of Figure 8.
Figure 10:
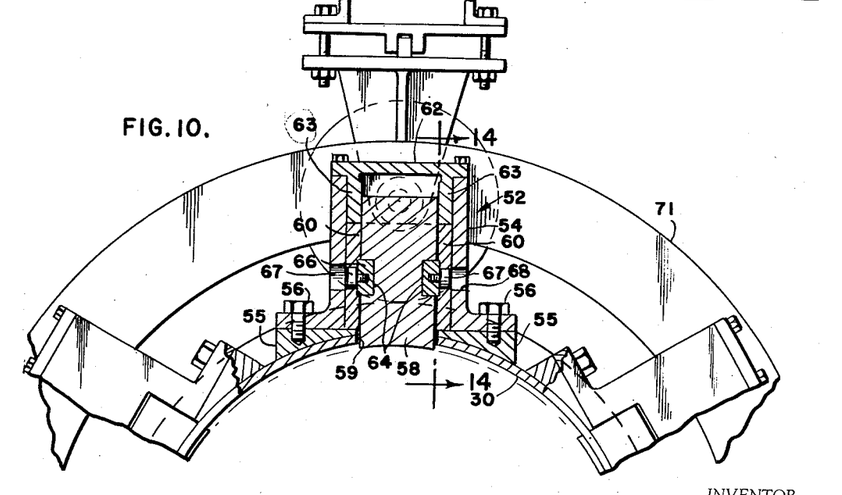
Figure 10 is an enlarged sectional view taken along line 10—10 of Figure 7.
Figure 13:
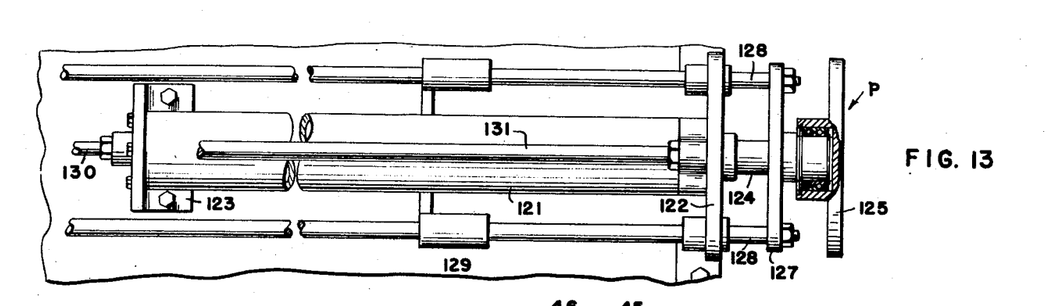
Figure 13 is an enlarged plan view of the pusher shown in part in Figure 1; and, Figure 14 is an enlarged, fragmentary sectional view taken along line 14—14 of Figure 10.

Referring more particularly to Figures 8 and 9, at each side of the bale holder 30, a fluid operated cylinder 74 is mounted on the supporting framework W. Each cylinder 74 has an outwardly extending piston rod 75 with a shoe 76 connected to the outer end of the rod. Each shoe 76 is slidably mounted in a holder 77 carried by the supporting structure W. Each shoe 76 includes a yoke portion 78 extending around the outer edge portion of the ring 71. Yoke positions 78 of the two shoes 76 straddle the outer edge of the ring 71 so that when the shoes 76 are moved forwardly or rearwardly, the ring 71 and slides 58 of the clamping devices 52 are moved in the same direction. The ring 71 rotates with the drum or cylinder 30 and the yoke portion 78 slidably engages the outer periphery of the ring 71 so that the ring 71 is free to rotate in the shoes. The operator by operating a suitable control device, not shown, can admit fluid under pressure to the head end of the cylinder 74 to move the shoes 76 outwardly or forwardly and thereby move the clamps 58 inwardly to grip a bundle 26 inside of the holder 30. During the cutting operation the fluid in the head end of a cylinder 74 is maintained under pressure to hold the clamping members 58 against the bundle so that the bundle is securely gripped and held. The operator also by actuating the control device can admit fluid under pressure to the rod end of the two cylinders 74 to retract or move rearwardly the shoes 76 and retract or move outwardly the clamps 58 to release the bundle in the holder 30.

Two transverse cuts are made across each bundle 26 although more or less cuts may be made depending upon the length of the bundle and the character of the scrap metal, while in some cases, as described fully hereinafter it may not be necessary to cut the bale transversely. As shown, when the bundle 26 is in the position to be cut a portion 28 extends outwardly beyond the forward end of the holder 30 and the saw makes a cut across the bundle adjacent the end of the holder 30, Figure 1. While the saw is making the cut, the bundle 26 is being rotated by the holding means H and the saw is moved to cut about halfway across the bundle. As the bundle is rotating this will completely sever the portion 28 from the bundle.

The saw S includes a carriage 80 having rolls 81 engaging the top and bottom surfaces of ways 82 mounted on the supporting framework 83. A fluid operated cylinder 84, Figure 4, is mounted on the framework 83 and has a piston rod 85 connected to the carriage 80 at 86 for moving the carriage 80 forwardly and backwardly along the ways 82. On the carriage 80 there is mounted an electric motor 89. A rotary saw blade 90 is mounted on one end of a shaft 91 rotatably supported in the bearings 92 on carriage 80. The electric motor 89 is connected to shaft 91 for rotating the saw 90 which is preferably provided with a safety cover 94.

While the saw blade 90 may be of any suitable type, a preferred form for cutting a bundle of tinplate ribbon is the type of blade which primarily cuts the bundle by friction. The teeth of the saw blade 90 are relatively large and preferably formed of or covered with wear-resistant metal. The outer peripheral edge of the saw blade 90 could be a continuous ring, although it is preferably formed with notches to provide teeth. Although these teeth are relatively long and dull as compared to the usual sharp pointed teeth, where the metal in the bale is sufficiently solid to permit the use of a saw with the customary type of sharp teeth, such a saw blade may be used.

Figure 5:
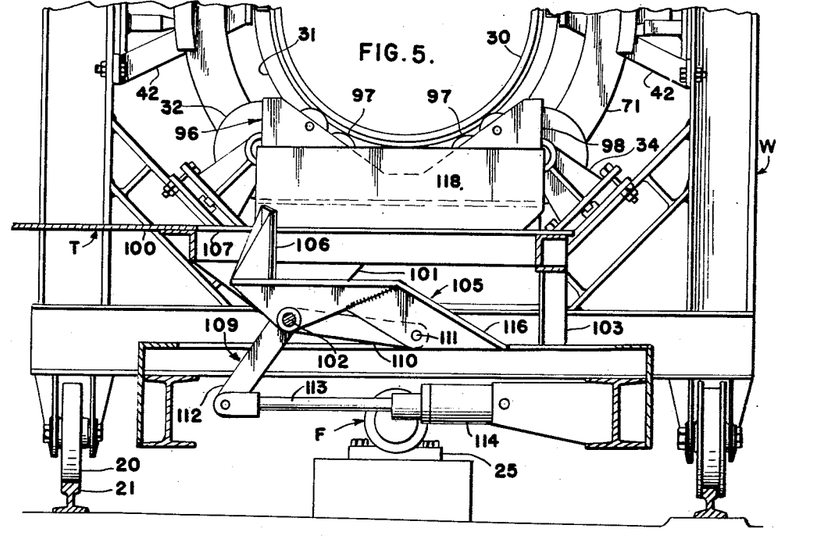
Figure 5 is an enlarged fragmentary view taken along line 5—5 of Figure 3.
Figure 6:
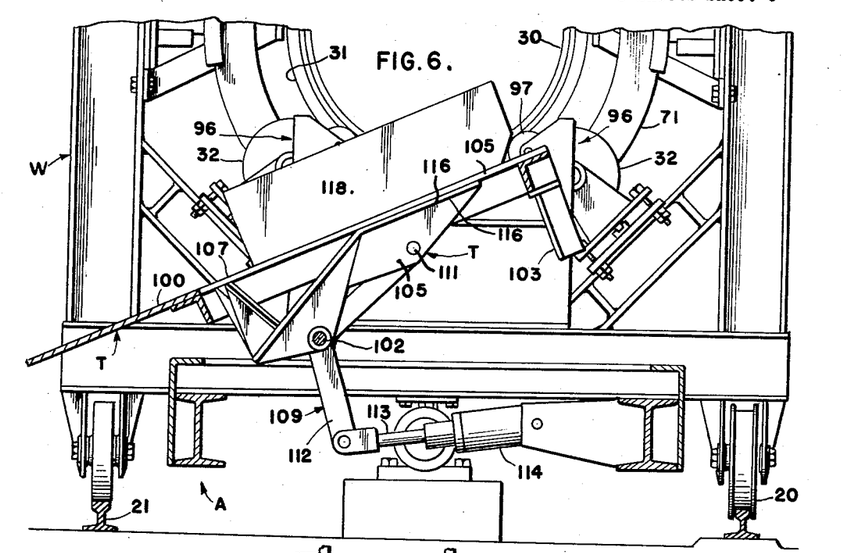
Figure 6 is a view similar to Figure 5 with part of the apparatus in a different position.
Figure 7:
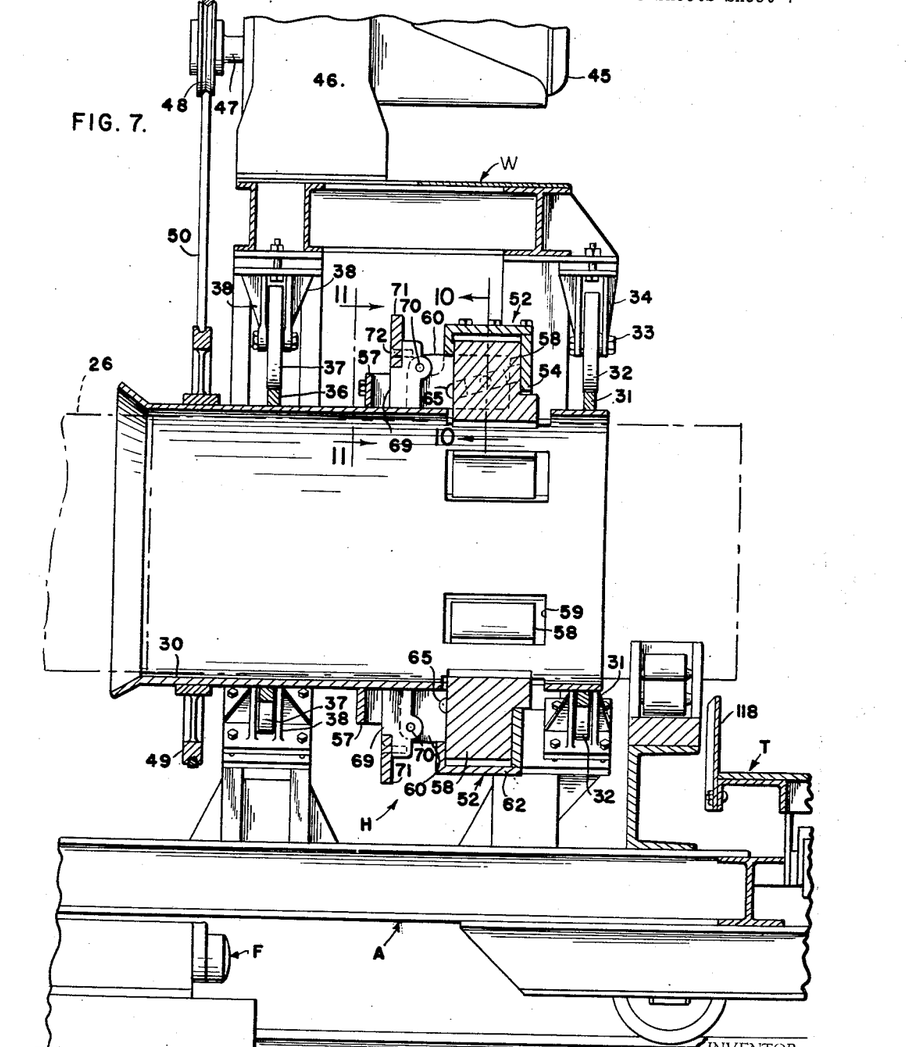
Figure 7 is an enlarged, vertical, fragmentary sectional view taken along line 7—7 of Figure 2.

As the portion 28 is being cut from the bundle, portion 28 tends to sag and accordingly a support 96 is provided for supporting the rotating portion 28 of the bundle to reduce "whipping." As shown more clearly in Figures 5, 6 and 8, the support 96 includes a series of rolls 97 rotatably supported in the supporting framework 98 mounted on the carriage A. The rolls 97 are arranged about the lower peripheral portion of the bundle with their inner edges slightly below or outside of the inner peripheral surface of holder 30 so that when a bundle 26 is positioned in the holder, the portion 28 will be slightly spaced above the rolls 97 and the rolls 97 will not interfere with advancing the bundle through the holder 30.

Figure 3:
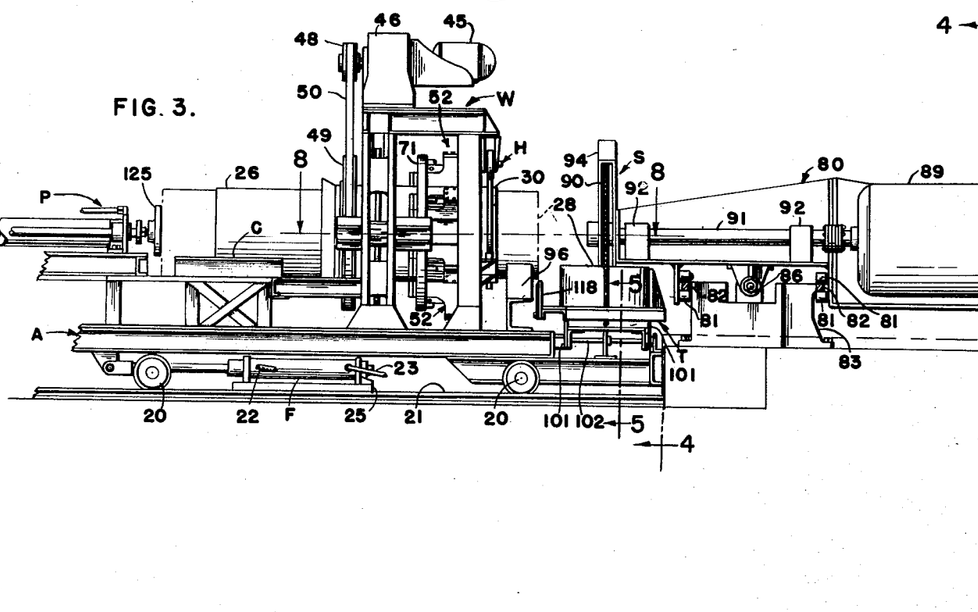
Figure 3 is a side view in elevation of the apparatus of Figure 1.

After the portion 28 has been severed the portion or pancake 28 is deposited on the receiving and cutting table T in the position shown in full lines in Figure 3. The severed portion 28 may fall onto the table T under the influence of gravity or the support 96 may support the portion 28 sufficiently so that the severed portion is tipped over onto the table T when the pusher P is operated to advance the bundle through the holder 30. As the bundle comprises ribbon material extending both around and longitudinally of the bundle, the portion 28 does not fall to pieces and must be split so that the scrap will be made up of loose relatively short lengths, for proper subsequent treatment. The supporting table T includes a flat tiltable table 100 having adjacent opposite sides depending brackets 101 tiltably supporting the table 100 on a shaft 102. Depending legs 103 adjacent the opposite side of the table 100 support the table on the framework so that normally the table 100 is supported in its horizontal or receiving position shown in Figure 5.

As shown more clearly in Figure 8, the table 100 includes a slot 104 extending across the table below the bundle so that when the saw blade 90 has moved across the portion 28, the bottom portion of the saw blade 90 can extend downwardly below the top of the table 100 and completely sever the portion 28. Beneath the table 100, a table tilting member 105 is tiltably mounted on shaft 102 and is connected to a stop member 106 which projects upwardly through the enlarged opening 107 to prevent the portion 28 from sliding forwardly off of the table 100 when the saw 90 is moved forwardly across the portion 28. A bell crank 109 is mounted on shaft 102 and has a rearwardly extending arm 110 connected to the table tilting member 105 at 111. The bell crank 109 also includes a downwardly extending arm 112 connected to the outer end of a piston rod 113 of a fluid operated cylinder 114. After the portion 28 has been split, the operator through suitable control means, not shown, can admit fluid under pressure to the rod end of cylinder 114 to retract the piston rod 113 and swing the bell crank 109 about the axis of shaft 102. As the bell crank starts to move, the table tilting member 105 will tilt on the shaft 102 and draw the stop 106 downwardly through the opening 107 and out of the way of the portion 28 on the table 100. Further movement of the piston rod will raise the rear portion of the tilting member 105 until the flat surface portion 116 engages the bottom surface of the table 100 at which time the stop 106 is below table 100. Further movement of the piston rod 113 toward the right will tilt the table 100 about the axis of the shaft 102 to the position shown in Figure 6 and when the table is in this position, the split portion 28 will slide off of the table and into suitable receiving means, not shown. The table 100 may be provided with upwardly extending sides 117 and 118 for preventing scrap metal from falling off the sides of the table.

The bundle 26 is formed by winding ribbon scrap metal under tension. When the portion 28 is split on table T, the two halves tend to spring apart and each half tends to fall apart into loose scrap. This spreading is indicated by the broken lines in Figure 8.

Power actuated pusher means P is provided for advancing bundles from the receiving cradle C into and through the holding means H. As shown more clearly in Figures 1 to 3 and 13, the means P includes a fluid operated cylinder 121 supported at its rod end by a cross member 122 and at its head end by a cross member 123 with the members 122 and 123 being fixedly mounted on the carriage A. Cylinder 121 has an outwardly extending piston rod 124 which rotatably supports on its outer end a pusher or pusher head 125. A cross member 127 is mounted on piston rod 124 in back of head 125 and is connected to the outer end of a pair of guide rods 128. The guide rods 128 are slidably mounted in cross member 122 and a support 129. The guide rods 128 move back and forth with the piston rod 124 and prevent the rod from twisting or bending when pushing bundles 26 forwardly. Cylinder 121 is provided with at least one connection 130 at its head end for admitting fluid under pressure to the head end of the cylinder. The rod end of the cylinder 121 is provided with a pipe 131 connecting the rod end of the cylinder to a source of fluid under pressure. Thus, the operator by operating suitable control means, not shown, can admit fluid under pressure through pipe 130 to move the pusher 125 outwardly and toward the right to push a bundle 26 forwardly. The operator can also operate control means to admit fluid pressure through pipe 131 to the rod end of the cylinder to retract the pusher 125 to the position shown in Figure 1.

Preferably the cylinder 121, like the cylinder F, is a hydraulic cylinder as hydraulic cylinders can be controlled to position more accurately a member such as the carriage A or the bundle 26. The cylinders 74 are preferably pneumatic cylinders in which a gas such as air is used to move the piston rods. Pneumatic cylinders are preferred for this purpose as they provide a certain amount of resiliency and can urge all of the jaws 58 resiliently inwardly against the bundle 26 so that the holding and rotating means H can readily accommodate bundles of varying diameters. Preferably the cylinder 84 is a pneumatic cylinder so that the cylinder can be used to resiliently urge the saw blade 90 against the bundle or against the portion 28. The cylinder 114 for tilting the table, may be either hydraulic or a pneumatic cylinder. While the preferred type of means has been described for operating the various devices, it is to be understood that other types of power actuated means may be used and, for example, an electric motor may be substituted for the hydraulic cylinder F for moving the carriage A along the rails 21.

The means for controlling the various hydraulic and pneumatic cylinders and electric motors are preferably disposed at a common control panel or station located at a point spaced from the apparatus. The location of this control panel is not shown as it forms no part of the present invention but, the control panel is preferably located where the operator will not be in danger and where the operator can view the various operations of the machine.

Figures 2, 14:
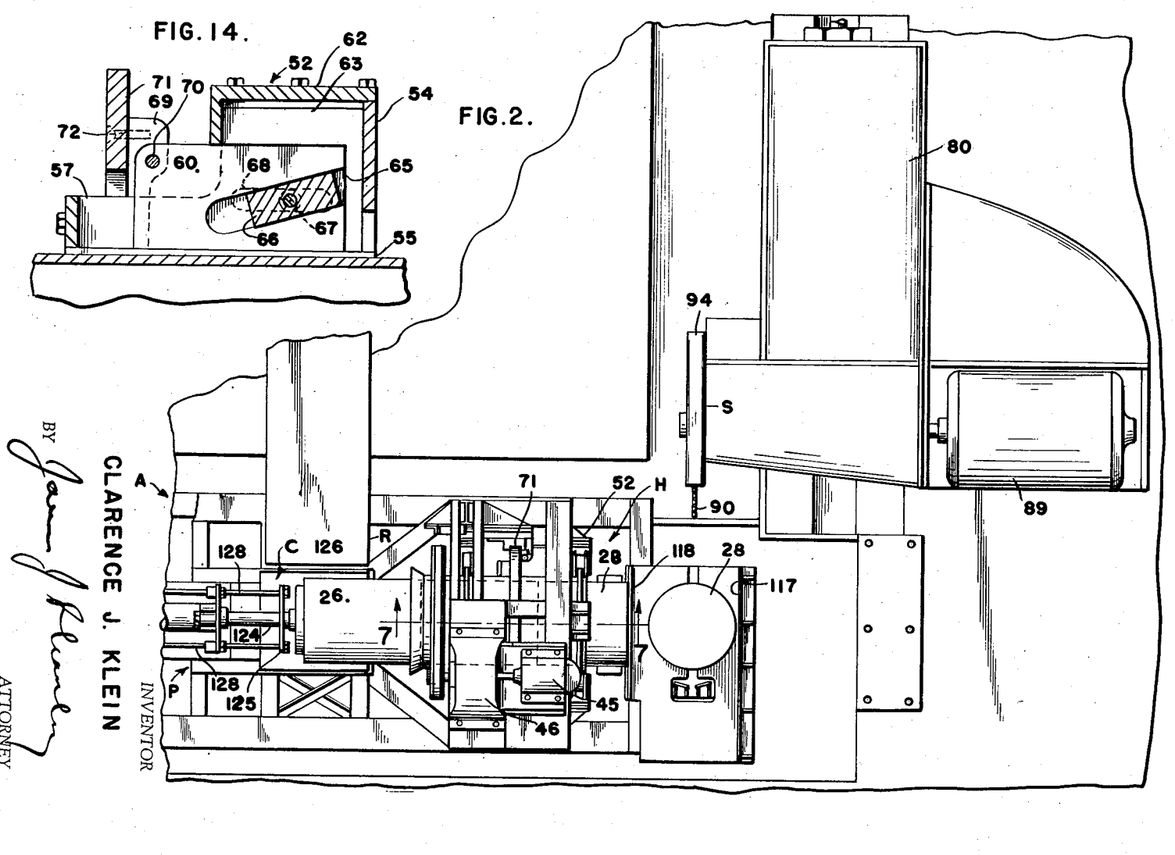

A cycle of operation will be described with it being assumed that the saw is in the retracted position shown in Figure 2, that no bundles 26 are on the carriage A and that the carriage A has been positioned on the rails 21 with the bundle receiving cradle C in alignment with the ramp R. The pusher P will also be in the retracted position shown in Figure 3. The operator then retracts the stop U so that the bundle of scrap rolls off of the ramp R and onto the cradle C. The ramp R and stop U may be any suitable type and the apparatus shown in application Serial No. 271,523, filed February 14, 1952, by Joseph M. Bendot, for Article Handling Apparatus may be used. After this first bundle has moved past the stop U, the stop U is raised to hold back the remaining bundles on the ramp. Then the pusher P is actuated, and the head 125 moves outwardly to push the bundle 26 into the holder 30 of the holding means H. When processing bundles of the type shown and described, it is necessary at the start of operations to have a second bundle 26 on the carriage A. Accordingly, the head 125 is retracted and then a second bundle is fed forwardly onto the cradle C. The operator then causes the head 125 to move forwardly toward the right and advance both bundles forwardly until a portion 28 of the first bundle 26 extends outwardly beyond the holder 30. The cylinders 74 then move the shoes 76 and ring 77 forwardly and force the clamps 58 inwardly against the bundle in the holder 30 to securely hold this bundle. The electric motor is started to rotate the holder 30 and the bundle therein. Preferably, the pusher head 125 is maintained against the end of the second bundle 26 so that this bundle is held between the bundle in the holder 30 and the pusher 125. As the pusher head 125 is rotatable the second bundle can also rotate along with the first bundle and is held securely in place so that it will not whip.

Figure 1:
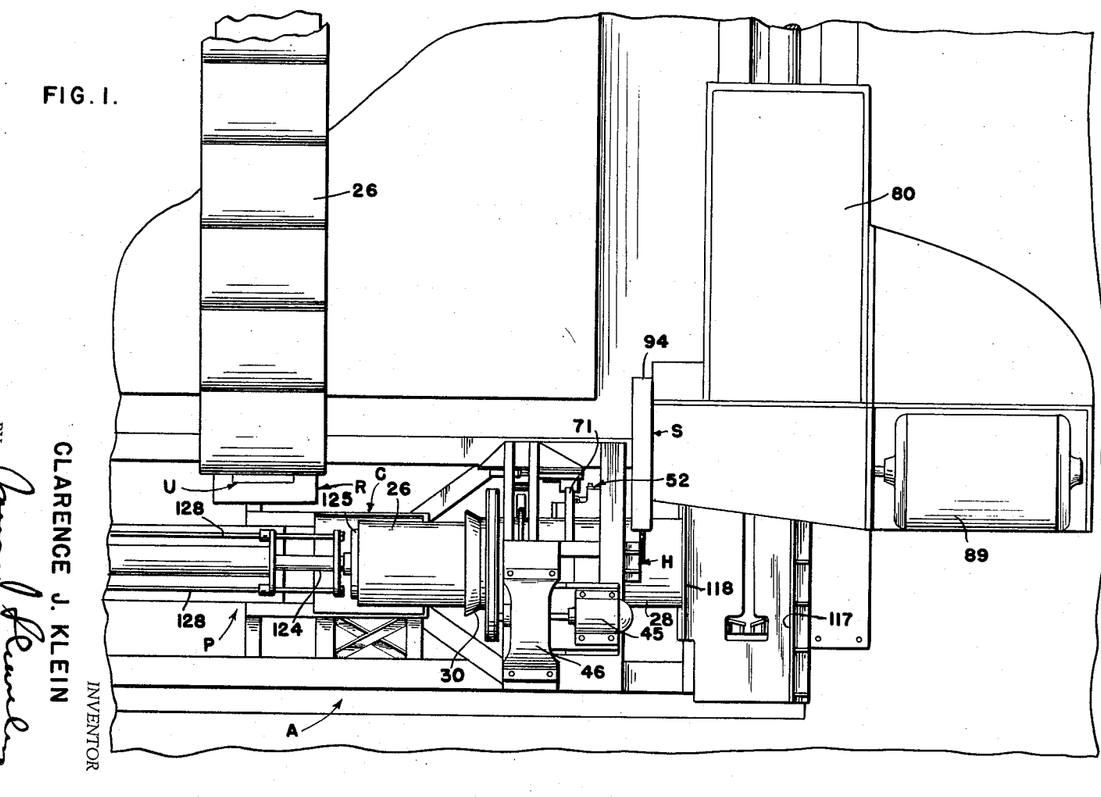
Figure 1 is a plan view of apparatus embodying principles of the present invention, with portions removed to clarify the showing of the apparatus.

Prior to making a cut, the carriage A is moved through the operation of cylinder F along rail 21 so that the portion 28 is in the position shown in Figure 1 and in position for the saw to sever the portion. Then the cylinder 84 is actuated to urge the saw blade 90 against the bundle. Prior to this, motor 89 is started so that when the blade 90 is urged against the bundle it is rotating. The cylinder 84 continually urges blade 90 forwardly as the cut proceeds and after the portion 28 has been severed the cylinder 84 retracts the saw S along the ways 82. If the bundle 28 does not fall down onto table T, the cylinders 74 are actuated to retract the ring 71 and release the clamps 58. Then the pusher P is operated to advance the bundles forwardly the length of portion 28 and this forward advance of the bundles through the holder 30, will push the severed portion 28 off of the support 96 and down onto the table T. Prior to splitting the portion 28 on table T, the cylinder F is actuated to move the carriage A along the rails to align the saw blade with the slot 105 after which the cylinder 84 is actuated to move the saw blade 90 forwardly against the portion 28 and the portion 28 is split. After the portion 28 has been split the cylinder 84 is actuated to retract the saw and then the cylinder 114 is actuated to retract piston rod 113 and tilt the table 100 from the position shown in Figure 5 to the position shown in Figure 6. Before the table 101 tilts at least an appreciable extent, the stop 106 is moved downwardly in opening 107 and out of the way of the split bundle. After the split portion has been discharged from table 100, cylinder 114 is actuated to move piston rod 113 outwardly and return the table 100 to its normal position for receiving the next severed portion 28.

After the pusher P has been operated to advance the bundles forwardly to position the next portion 28 in position for cutting, the cylinder is actuated to move the carriage A along the track to align the portion 28 with the saw S. The cycle of operations is repeated until another bundle 26 has to be fed forwardly onto the cradle at which time the carriage is moved along the rails to align the cradle with the ramp R. The pusher P is retracted as is the stop 28 and another bundle is fed forwardly onto the cradle. After this the pusher P advances the bundle as described previously.

The bundle 26 is made up of one or more long narrow ribbons of tinplate with the ribbons being wound around and around the bundle so that the bundle is a relatively stable compact mass of ribbon tinplate. While severing the portion 28 produces a pancake that is shorter than bundle 26, the pancake 28 is similar in character to bundle 26 in that the ribbon tinplate is wound around the pancake and the pancake will not readily fall apart and cannot be satisfactorily tumbled and chemically treated in apparatus for example, of the type shown in copending application, Serial No. 295,108, filed June 23, 1952, now Patent No. 2,764,473, issued September 25, 1956, for Apparatus for Detinning Scrap by C. J. Klein and W. H. Wright. When the pancake or bundle 28 is split on the table T by the saw S, the ribboned tinplate readily separates into a mass of loose, relatively short lengths that can be treated in the manner described in the above identified application.

In certain instances, such as when the bundle 26 is relatively short or when the ribbons of tinplated strip are entwined in such a manner as to allow this operation, the bundle 26 may only be cut transversely a relatively small number of times including one, or may not be cut transversely and may be placed directly on the table T and then split along its longitudinal axis with the saw S properly positioned for that purpose. It is to be expressly understood therefore that the present invention provides two embodiments for processing metal bundles, such as bundles of entwined ribbons of tinplated strip. In one embodiment the bundles are received by the holder 26 and cut transversely into a number of sections with each section being subsequently severed longitudinally. In the other embodiment, the bundles are only split or cut longitudinally. In both cases the single or plural cutting cuts the ribboned material into relatively shorter lengths that readily fall apart for efficient chemical detinning treatment.

There is thus provided by the present invention a novel method of and apparatus for welding and cutting metallic articles or bundles such as for cutting bundles of entwined ribbons of tinplated scrap to present a loose mass of relatively short pieces of tinplate scrap ribbon for processing in a chemical detinning operation with a high degree of efficiency.

Although several embodiments of the invention have been disclosed and described above it is to be expressly understood that various changes and substitutions may be made therein without departing from the spirit of the invention as well understood by those skilled in the art. Reference therefore will be had to the appended claims for a definition of the limits of the invention.

What is claimed is:

1. Apparatus for receiving a portion cut from a body including a table in position to receive the portion cut from the body, means supporting the table for tilting to a discharge position to discharge the portion cut from the body, a stop member extending from below the table upwardly above the table, a swingable table tilting member spaced below the table and connected to the stop member, and means for swinging the table tilting member to tilt the table to the discharge position, said table tilting member and stop member being arranged to swing the stop member downwardly below the table before the table is tilted to the discharge position.

2. In apparatus for splitting a body, a table for supporting the body to be split, a saw movable across the table to split the body, a saw slot in the table, a stop member extending from below the table upwardly above the table for holding the body on the table while the saw moves across the table, and means for retracting the stop member below the table and for tilting the table to discharge the split body.

3. In apparatus for splitting a body, a table for supporting the body to be split, means supporting the table for tilting to a discharge position to discharge the split body, a saw movable across the table to split the body, a saw slot in the table, stop means for holding the body on the table while the saw moves across the table, a swingable table tilting member spaced below the table and connected to the stop means, and means for swinging the table tilting member to tilt the table to the discharge position, said table tilting member and stop means being arranged to swing the stop means downwardly below the table before the table is tilted to the discharge position.

4. Apparatus for cutting a body of material comprising in combination, a table means for receiving the body, holder means for holding and rotating the body about an axis, pusher means for pushing the body forwardly from the table means onto the holder means with a portion extending outwardly from the holder means, cradle means adjacent the holder means for supporting the portion extending outwardly from the holder means, and saw means movable along a path transversely of the axis for severing the portion.

5. Apparatus for cutting a body of material comprising in combination, a first table means for receiving the body, means for holding and rotating the body for cutting, pusher means for pushing the body forwardly from the first table means onto the holder means with a portion extending outwardly from the holder means, cradle means adjacent the holder means for supporting the portion extending outwardly from the holder means, saw means movable along a path transversely of the body for severing the portion, a tiltable table for receiving the severed portion, means for moving the saw means across the tiltable table for splitting the severed portion, and means for tilting the tiltable table to discharge the split severed portion.

6. Apparatus for cutting a body of material comprising in combination, a table means for receiving the body, holder means for holding and rotating the body about an axis for cutting, pusher means for pushing the body forwardly from the table means onto the holder means with a portion extending outwardly from the holder means, cradle means adjacent the holder means for supporting the portion extending outwardly from the holder means, saw means movable along a path transversely of the axis for severing the portion, and a carriage mounted on rail means supporting the holder means adapted for moving the holder means relative to the saw means.

7. Apparatus for cutting a body of material comprising in combination, a first table means for receiving the body for cutting, holder means for holding and rotating the body about an axis, pusher means for pushing the body forwardly from the first table means onto the holder means with a portion extending outwardly from the holder means, cradle means adjacent the holder means for supporting the portion extending outwardly from the holder means, saw means movable along a path transversely of the axis for severing the portion, a tiltable table for receiving the severed portion, means for moving the saw means across the tiltable table for splitting the severed portion, means for tilting the tiltable table to discharge the split severed portion, and a carriage mounted on rail means supporting the holder means and the tiltable table adapted for moving the holder means and the tiltable table relative to the saw means.

References Cited in the file of this patent

UNITED STATES PATENTS

| Number | Name | Date |
|---|---|---|
| 744,572 | Lemberg | Nov. 17, 1903 |
| 902,767 | Sheldon | Nov. 3, 1908 |
| 1,745,699 | Kleeb et al. | Feb. 4, 1930 |
| 1,848,288 | Welch | Mar. 8, 1932 |
| 1,939,441 | Einig | Dec. 12, 1933 |
| 2,158,058 | Godfriaux | May 16, 1939 |
| 2,272,179 | Allardt | Feb. 10, 1942 |
| 2,327,921 | Moohl | Aug. 24, 1943 |
| 2,362,701 | Koehring | Nov. 14, 1944 |
| 2,423,629 | Vogeli | July 8, 1947 |
| 2,480,536 | Andrus | Aug. 30, 1949 |
| 2,665,473 | Wilckens | Jan. 12, 1954 |
| 2,666,461 | Johnson | Jan. 19, 1954 |
| 2,667,356 | Forward | Jan. 26, 1954 |

FOREIGN PATENTS

| Number | Country | Date |
|---|---|---|
| 511,097 | Great Britain | Aug. 14, 1931 |